United States Patent [19]
Wiegert

[11] 4,235,715
[45] Nov. 25, 1980

[54] PROCESS FOR REMOVING ALKALINITY AND HARDNESS FROM WATERS

[75] Inventor: Robert E. Wiegert, Middletown, Ohio

[73] Assignee: Water Refining Company, Inc., Middletown, Ohio

[21] Appl. No.: 12,589

[22] Filed: Feb. 16, 1979

[51] Int. Cl.$^3$ .................... B01D 15/04; B01D 19/00; B01J 49/00

[52] U.S. Cl. .................... 210/670; 210/96.1; 210/685

[58] Field of Search ............. 210/21, 26, 32, 37 R, 210/38 R, 38 A, 96 R, 188, 25; 4/96.1

[56] References Cited

U.S. PATENT DOCUMENTS

| | | | |
|---|---|---|---|
| 2,807,582 | 9/1957 | Applebaum | 210/26 |
| 2,841,550 | 7/1958 | Beohner | 210/26 |
| 3,342,730 | 9/1967 | Mihara et al. | 210/38 |
| 3,388,059 | 6/1968 | Wirth | 210/32 |
| 3,423,311 | 1/1969 | Hetherington et al. | 210/38 |
| 3,458,438 | 7/1969 | Smith et al. | 210/26 |
| 3,618,589 | 11/1971 | Tovani | 210/38 X |
| 3,679,580 | 7/1972 | Boari et al. | 210/26 |
| 3,715,287 | 2/1973 | Johnson | 210/38 X |
| 3,928,192 | 12/1975 | Katzakian, Jr. et al. | 210/38 X |

OTHER PUBLICATIONS

Diamond Shamrock, "Duolite Ion Exchange Resins—C-433 & C-464 Weak Acid Cat—Exch. Resins in H$_2$O Treatment."
Resindion, "Relite CM-2 Mixed Cat. Exchanger" Sybron Corp.
Rohm & Hass, "A New Concept in Home Water Conditioning: Amberlite DP-1".

*Primary Examiner*—Ferris H. Lander
*Attorney, Agent, or Firm*—Biebel, French & Nauman

[57] ABSTRACT

Raw water is fed to a first column containing a weak acid cation exchange resin in hydrogen form where alkalinity causing ions and hardness causing ions to the extent of alkalinity are converted to carbonic acid. The carbonic acid, which hydrolyzes to dissolved carbon dioxide, is stripped from the water in a decarbonation unit by passing air countercurrent to the flow of water through the unit. The water is then fed to a second column containing a weak acid cation exchange resin in sodium form which removes residual hardness causing ions along with neutralization of any mineral acids or residual dissolved carbon dioxide. Both resins are substantially completely regenerated upon exhaustion to provide a process in which the maximum capacities of the resins are utilized, and the process is carried out with a minimum of monitoring and control.

9 Claims, 2 Drawing Figures

PROCESS FOR REMOVING ALKALINITY AND HARDNESS FROM WATERS

BACKGROUND OF THE INVENTION

The invention relates to water treatment, and more particularly to the removal of hardness and alkalinity from waters used as feed waters for boilers and other industrial applications.

Use of raw water containing hardness and alkalinity causing elements as boiler feed water or for other uses can cause substantial damage to equipment as well as requiring frequent cleaning operations. The total hardness of a water is generally understood in the art to be caused by the combined concentrations of its calcium and magnesium salts. The alkalinity of a water is generally understood to be caused by the combined concentrations of its carbonate, bicarbonate, and hydroxide salts. Both values are usually expressed as parts per million (ppm) calcium carbonate. Needless to say, the damage and cleaning problems caused by high concentrations of such materials in water supplies are quite expensive to a commercial operation both in down time and in cost to replace equipment. In terms of operating and investment costs, it is much more economical to treat raw feed water to remove hardness and alkalinity prior to introducing it into equipment.

For example, in the treatment of boiler feed water for low pressure boilers, it is important to reduce the hardness of the feed water to a minimum to prevent scale. It is also important to reduce the bicarbonate or carbonate alkalinity to a minimum, which reduces the carbon dioxide content in the stream produced by the boiler to a minimum and prevents corrosion of the boiler and associated piping and condensing equipment.

It has been common practice in the art to treat raw feed water with ion exchange resins, both cationic and anionic, alone or in combination with degasifying or decarbonating units to reduce the hardness and alkalinity levels in such feed water to a minimum. For example, Smith et al, U.S. Pat. No. 3,458,438, teach treatment of water for hardness and silica removal by passing the water through a bed of weak acid cation exchange resin to remove heavy metal cations and partially remove alkali metal cations. Part of the effluent is then treated to remove carbon dioxide, passed through a bed of anion exchange resin, and then recombined with the other portion of effluent. Hetherington et al, U.S. Pat. No. 3,423,311, teach softening water whose hardness exceeds its alkalinity by adding carbonate or bicarbonate ions in an amount equal to the quantitative difference between the amount of hardness and alkalinity causing ions in the water, passing that water through a bed of weak acid cation exchange resin, and removing any resulting carbon dioxide from the water.

Still another method for removing hardness and alkalinity from raw water is taught by Applebaum, U.S. Pat. No. 2,807,582. In that process, raw water feed is split into two streams, the first stream passed through a bed of hydrogen zeolite and the second stream passed through a bed of sodium zeolite. The streams are then combined and sent through a carbon dioxide removing unit prior to being passed through a bed of anion exchange resin.

Each of the prior methods, however, has drawbacks which render it not entirely satisfactory. Where the raw water is split into two or more streams, the relative flows of each stream must be constantly adjusted to match the changing ion concentrations in the feed water. Use of multiple ion exchange resins requires use of several different regenerating agents at higher operating costs and higher initial costs since extra equipment must be purchased to house the resins and regenerating materials. Additionally, complete regeneration of strong acid ion exchange resins to the hydrogen form is impractical due to the large excess of regenerant required.

As can be seen, there is still a need in the art for an efficient method of reducing hardness and alkalinity levels in raw water with a minimum need for extra equipment and controls.

SUMMARY OF THE INVENTION

In accordance with the present invention, raw water, containing elements of both hardness and alkalinity, is initially passed through a column of a weak acid cation exchange resin in hydrogen form. The term weak acid cation exchange resin is generally understood in the art and will be used here to refer to those ion exchange resins which will readily exchange cations associated with bicarbonate, carbonate, and hydroxide anions but will exchange cations associated with strong mineral acid anions only to a limited extent. The weak acid resin will remove alkalinity, that is carbonate, bicarbonate, and hydroxide salts, by converting the salts to carbonic acid or water. The resin will also act to remove hardness (i.e., divalent cations of which calcium and magnesium are the predominant examples; although, other multivalent heavy metal ions may also be removed) to the extent that they are associated with alkalinity causing ions. The ion exchange process in the first column may be expressed as:

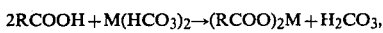

where R is the ion exchange resin and M is a divalent cation such as calcium or magnesium.

The carbonic acid formed by the ion exchange process in the first column breaks down into carbon dioxide and water and is removed by a simple aeration step. This is accomplished by passing the effluent from the first ion exchange column through a decarbonation unit. The decarbonation (or degasifying) unit consists of a tower containing some form of contacting medium such as Raschig rings, Berl or Intalox saddles, or even sieve trays. The effluent is allowed to trickle down from the top of the tower in a tortuous path through the contacting medium, forming thin films and drops along the way. Air is blown countercurrently upwardly through the tower and strips free carbon dioxide from the effluent. The air is then vented from the top of the tower to the atmosphere.

The partially treated water at this stage of the process may contain some residual hardness. As the final treatment step, the water is passed through a second ion exchange column containing a weak acid cation exchange resin in sodium form. The resin will remove all residual hardness in the water by exchanging sodium ions for all multivalent cations remaining in the water. This ion exchange process may be expressed as:

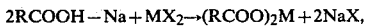

where R is the ion exchange resin, M is a multivalent (shown as divalent) cation, and X is an anion such as chloride. This second ion exchange column also serves to neutralize any acidity, whether it be free mineral acidity or residual dissolved carbon dioxide by replacing any hydrogen cations with sodium cations.

Both ion exchange columns may be readily substantially completely regenerated by passing a quantity of mineral acid, such as a solution of hydrochloric or sulfuric acid, at or only slightly in excess of the stoicheometric amount required through each column. The resin in the second column is then converted to sodium form by passing a solution of sodium hydroxide or sodium carbonate or a mixture of the two through the column. In this manner, the need for external controls on the two columns is minimized since both are regenerated to their fullest extent without regard for variations in raw feed water composition over time.

Accordingly, it is an object of this invention to provide a simple and efficient ion exchange process of removing alkalinity and hardness from raw water. This and other objects and advantages of the invention will become apparent from the following description, the accompanying drawings, and the appended claims.

DESCRIPTION OF THE PREFERRED EMBODIMENTS

Figure 1:
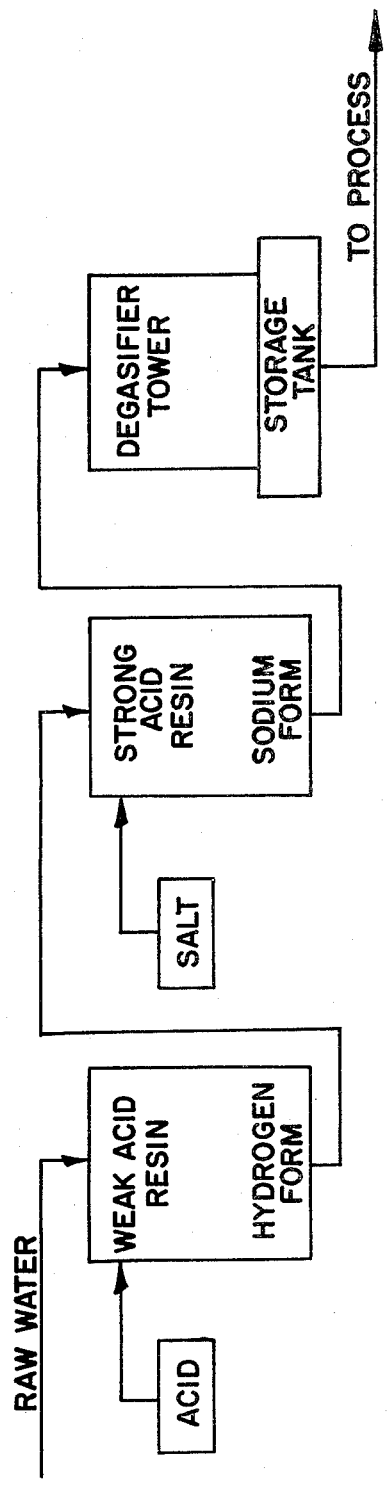
FIG. 1 is a flow diagram of a typical prior art water treatment scheme.

As shown in FIG. 1, a typical prior art treatment process involves passing raw water through a first column of weak acid ion exchange resin in hydrogen form and then passing the effluent through a second column containing a strong acid ion exchange resin in sodium form. The partially treated water is then passed through a degasifier or decarbonation tower. However, a property of weak acid cation exchange resins operating in the hydrogen form is that when treating raw water containing salts of chlorides, sulfates, and/or nitrates, the effluent from the resin column will have a much lower pH than the influent and will show traces of strong mineral acids. This phenomenon occurs even though there is no measurable strong acid capacity in such resins. The pH of the effluent from the resin column may initially be as low as 3, and will usually gradually rise to about 4 to 4.5 but remain acidic due to dissolved carbonic acid.

Since the second column containing a strong acid ion exchange resin in sodium form in the typical prior art scheme is there only for the purpose of removing hardness causing ions and has little or no ability to neutralize the acidity of the influent water, the prior art scheme required some modification to neutralize this effluent. Addition of a basic compound such as sodium hydroxide to the treated water is possible. But this adds an extra step to the treatment process and requires constant monitoring and control for the addition of proper amounts of base to bring the water back to a neutral or alkaline pH.

Another prior art solution was to operate the weak acid ion exchange resin column in a "starvation regeneration" mode. That is, during the regeneration of the column with acid, only enough acid would be added to regenerate the top portion of the column. The bottom portion of the column was left unregenerated in the divalent cation form (largely calcium and magnesium) to be exchanged with any mineral acid formed in the upper portion of the column. While this method eliminated the problem of an acidic pH effluent, it did so at the expense of lost ion exchange capacity in the column. Additionally, hardness, resulting from the divalent cations being displaced from the bottom of the column, appeared to a greater extent in the effluent.

Both of these factors result in both higher initial and operating costs for a water treatment system. If the initial weak acid ion exchange column is run at less than full capacity, then either it must have a larger amount of resin or be regenerated more frequently than a column which could be run at full capacity. In either event, costs go up. Additionally, the hardness leakage from the first column places a larger load on the second column to remove the hardness causing ions. Again, this results in increased costs for either more resin or more frequent regeneration for treating a given volume of water. Where water to be treated involves millions of gallons, the increased costs are significant.

Figure 2:
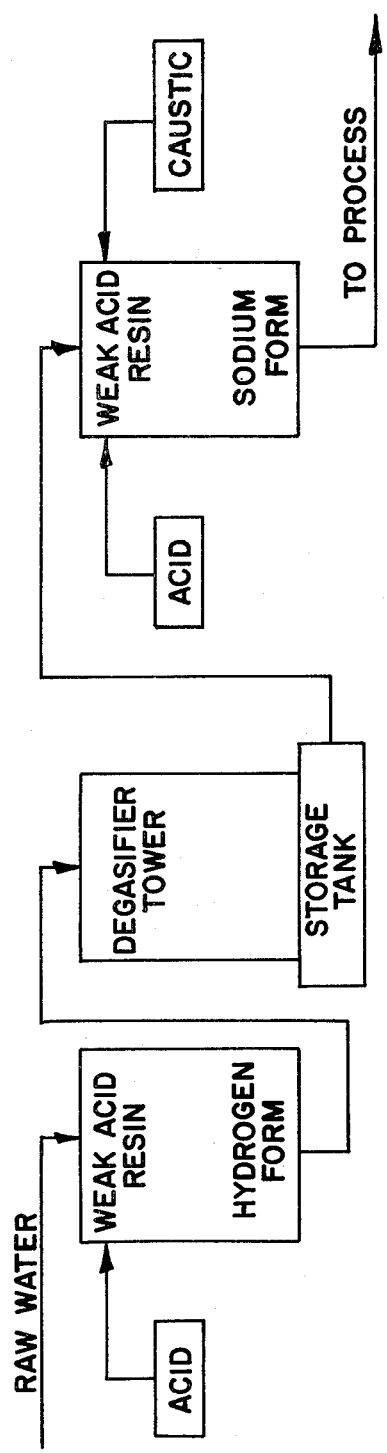
FIG. 2 is a flow diagram of the water treatment scheme of the present invention.

The water treatment scheme of the present invention, illustrated in FIG. 2, avoids the problems encountered by prior art processes and permits operation of both ion exchange columns at full capacity after full regeneration and with a minimum of monitoring or control. As shown in FIG. 2, raw water is initially passed through a weak acid cation exchange resin column which removes hardness cations to the extent that they are associated with alkalinity causing ions and converts the alkalinity causing ions to carbonic acid. Several commercially available weak acid ion exchange resins are suitable for use in the invention. In a preferred embodiment, a carboxylic acid resin, such as Duolite C-433 or C-464, available from Diamond Shamrock Corp., Redwood City, Calif.; or Amberlite DP-1, available from Rohm and Haas Corp, Philadelphia, Pennsylvania, is used for both resin columns.

The water is then passed through a degasification or decarbonation tower of conventional structure to remove the dissolved carbon dioxide in the water resulting from the hydrolysis of the carbonic acid. As is conventional in the art, the water is permitted to trickle down over contacting material, such as Raschig rings, sieve trays, or the like, while air is passed countercurrently upwardly past the water. This air will strip the major portion of dissolved carbon dioxide from the water.

Finally, the partially treated water is passed through a second column of weak acid cation exchange resin, with the resin being in sodium form. In sodium form, weak acid cation exchange resins exhibit a high capacity and selectivity for hardness causing ions such as calcium and magnesium. The second resin column will remove any residual hardness not removed by the first column by replacing all non-sodium cations with sodium.

A significant benefit of using a weak acid resin rather than a strong acid resin is that the weak acid resin in sodium form will neutralize any acidity in the water whether it be free mineral acid or residual dissolved carbon dioxide. Any acids present will be converted to neutral sodium salts or sodium carbonate. In fact, it has been found that treated water leaving the second resin column will have a slightly basic pH, an additional benefit where acid corrosion of metal pipes and surfaces was a problem in the past for boilers and similar equipment.

Because the sodium form weak acid resin in the second column automatically neutralizes any acidity in the water, the first column can be operated without regard to any acid leakage which may occur. That is, the first resin column may be operated at its full capacity and be regenerated fully upon exhaustion. This provides significantly more efficient operation than the prior art practice of operating a first weak acid resin column in a "starvation" regeneration mode.

In operation, the first resin column will remove alkalinity causing ions and hardness causing ions to the extent of alkalinity until the resin is exhausted. In practice, the resin is considered exhausted when effluent alkalinity reaches 10 percent of influent alkalinity. This value may be monitored and measured by means well known in the art. The resin is then regenerated with a mineral acid, preferably hydrochloric acid, to its maximum capacity. Because of the unique properties of weak acid ion exchange resins, almost stoicheometric regeneration can be achieved. That is, addition of an amount of acid slightly in excess (110-115%) of the total number of cation exchange sites on the resin will achieve complete regeneration.

The scheme of complete regeneration offers significant advantages over the prior art "starvation" regeneration. With the prior art practice, the ratio of alkalinity to theoretical mineral acidity (i.e., the total concentration of chloride, sulfate, and nitrate ions) of the raw feed water had to be closely monitored so that the correct amount of resin regeneration could be achieved. Since the composition of the raw feed water can and does vary from day to day, this necessitated almost constant monitoring with its accompanying increased costs in time and equipment. The present scheme of complete regeneration requires no monitoring other than that normally required in the art to ascertain when the exhaustion point of the bed has been reached. The maximum capacity of the bed is utilized as opposed to only a portion of the total capacity in the prior art.

Likewise, the second resin column is also operated at maximum capacity and regeneration is substantially complete. In practice, the resin is regenerated when some degree of hardness breakthrough is noted in the column effluent, such as 3-4 ppm of hardness. The resin is regenerated to sodium form by adding an amount slightly in excess (110-115%) of the stoicheometric amount of a mineral acid such as hydrochloric acid to the column to convert the resin to hydrogen form. This is followed almost immediately by the addition of an approximately stoicheometric amount of a basic sodium compound such as sodium hydroxide or sodium carbonate or a mixture of the two to exhaust the resin to sodium form. Because of the nearly stoicheometric conversions achieved, little or no regenerant is wasted, and there are no disposal problems for the essentially neutral metal salt wastes which are generated. Slightly greater amounts of basic sodium compound may be run through the column to insure complete conversion of the resin to sodium form and to provide a slightly basic waste stream to blend with the slight excess amount of acid remaining from the regeneration step to provide a neutral waste stream.

As can be seen, practice of the present invention permits utilization of the maximum ion exchange capacities of the resins in each column while at the same time minimizing the need for monitoring or control of the overall process. Essentially stoicheometric regeneration of the resins is achieved permitting lower regenerant costs.

While the methods herein described constitute preferred embodiments of the invention, it is to be understood that the invention is not limited to these precise methods, and that changes may be made therein without departing from the scope of the invention, which is defined in the appended claims.

What is claimed is:

1. A method of treating water to reduce its alkalinity and hardness content comprising the steps of:
   a. passing untreated water through a first ion exchange column containing a weak acid cation exchange resin in hydrogen form to convert the alkalinity causing ions therein to carbonic acid and to remove hardness causing ions to the extent of alkalinity;
   b. then directly passing the effluent from the first ion exchange column through a decarbonation unit to remove dissolved carbon dioxide from the effluent; and
   c. finally directly passing the effluent from the decarbonation unit through a second ion exchange column containing a weak acid cation exchange resin in sodium form to replace all residual hardness causing ions therein with sodium ions and to neutralize any acidity in said effluent.

2. The method of claim 1 in which the alkalinity causing ions are carbonate, bicarbonate, hydroxide, and mixtures thereof.

3. The method of claim 1 in which the hardness causing ions are calcium, magnesium, and mixtures thereof.

4. The method of claim 1 in which the weak acid cation exchange resins in said first and second columns are carboxylic resins.

5. The method of claim 4 in which the resin in said first column is substantially completely regenerated by the addition of a mineral acid.

6. The method of claim 5 in which the resin in said second column is substantially completely regenerated by the addition of a mineral acid followed by the addition of a sodium containing compound selected from the group consisting of sodium hydroxide and sodium carbonate.

7. A method of treating water to reduce its alkalinity and hardness content comprising the steps of:
   a. passing untreated water through a first ion exchange column containing a weak acid cation exchange resin in hydrogen form to convert the alkalinity causing ions therein to carbonic acid and to remove hardness causing ions to the extent of alkalinity;
   b. directly passing the effluent from said first ion exchange column through a decarbonation unit to removed dissolved carbon dioxide from said effluent;
   c. directly passing the effluent from said decarbonation unit through a second ion exchange column containing a weak acid cation exchange resin in sodium form to replace all residual hardness causing ions therein with sodium ions and to neutralize any acidity in said effluent;
   d. monitoring the effluents from said first and second ion exchange columns to determine when each column's exhaustion point is reached;
   e. substantially completely regenerating said resin in said first column to its hydrogen form and said resin in said second column to its sodium form when the exhaustion point is reached; and f. repeatings steps a. through e. for continued water treatment.

8. The method of claim 7 in which the ion exchange resin in said first column is substantially completely regenerated by the addition of an amount slightly in excess of the stoicheometric amount of hydrochloric acid.

9. The method of claim 8 in which the ion exchange resin in said second column is substantially completely regenerated by the addition of an amount slightly in excess of the stoicheometric amount of hydrochloric acid followed by a substantially stoicheometric amount of a sodium containing compound selected from the group consisting of sodium carbonate, sodium hydroxide, and mixtures thereof.

* * * * *